Dec. 17, 1935.  W. O. SNYDER  2,024,397
REFRIGERATING SHIPPING CARTON
Filed Nov. 11, 1932   3 Sheets-Sheet 1
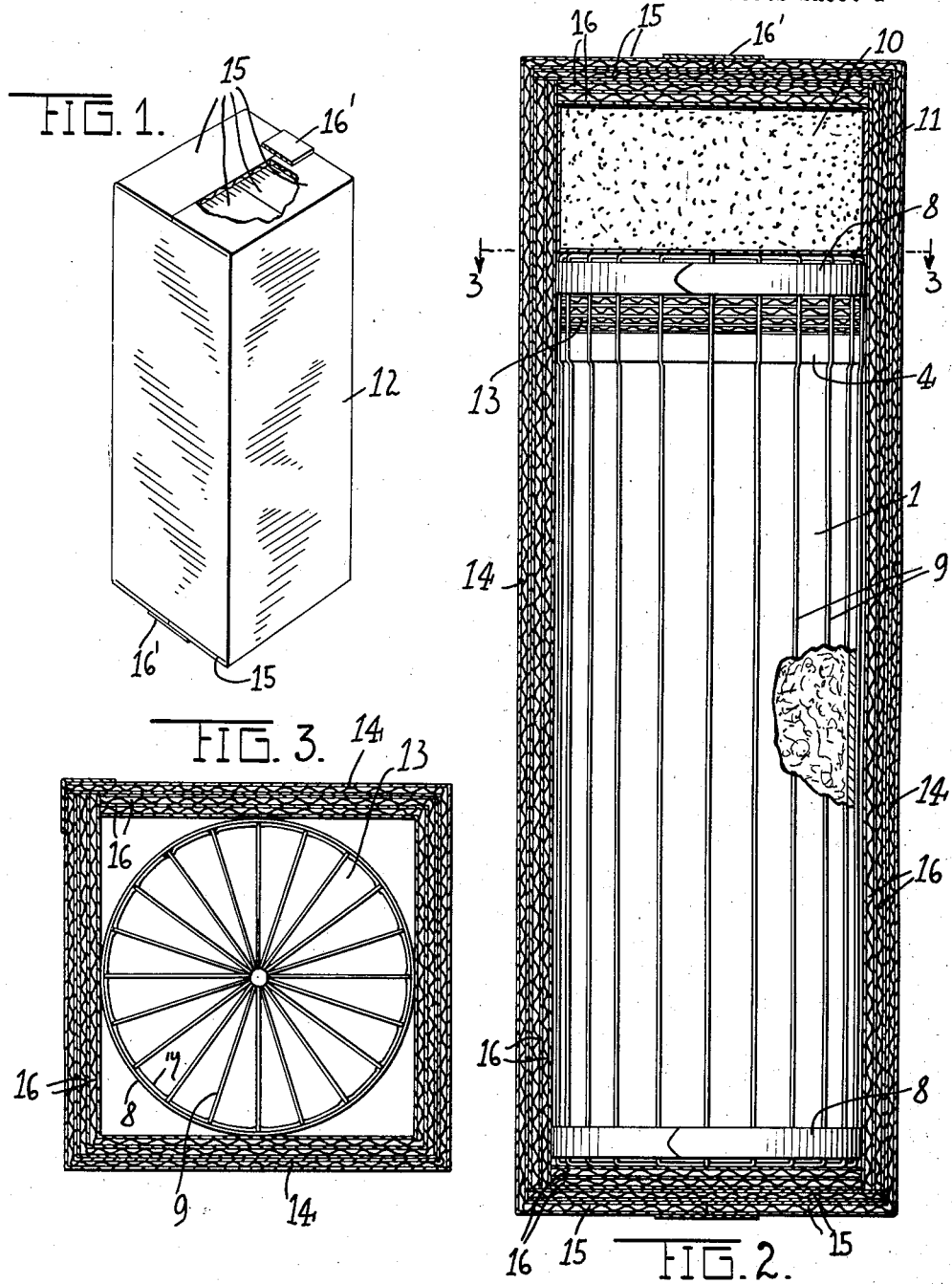
INVENTOR
WILLIS O. SNYDER
BY
Mason, Fenwick & Lawrence
his ATTORNEYS Dec. 17, 1935.   W. O. SNYDER   2,024,397
REFRIGERATING SHIPPING CARTON
Filed Nov. 11, 1932   3 Sheets-Sheet 2
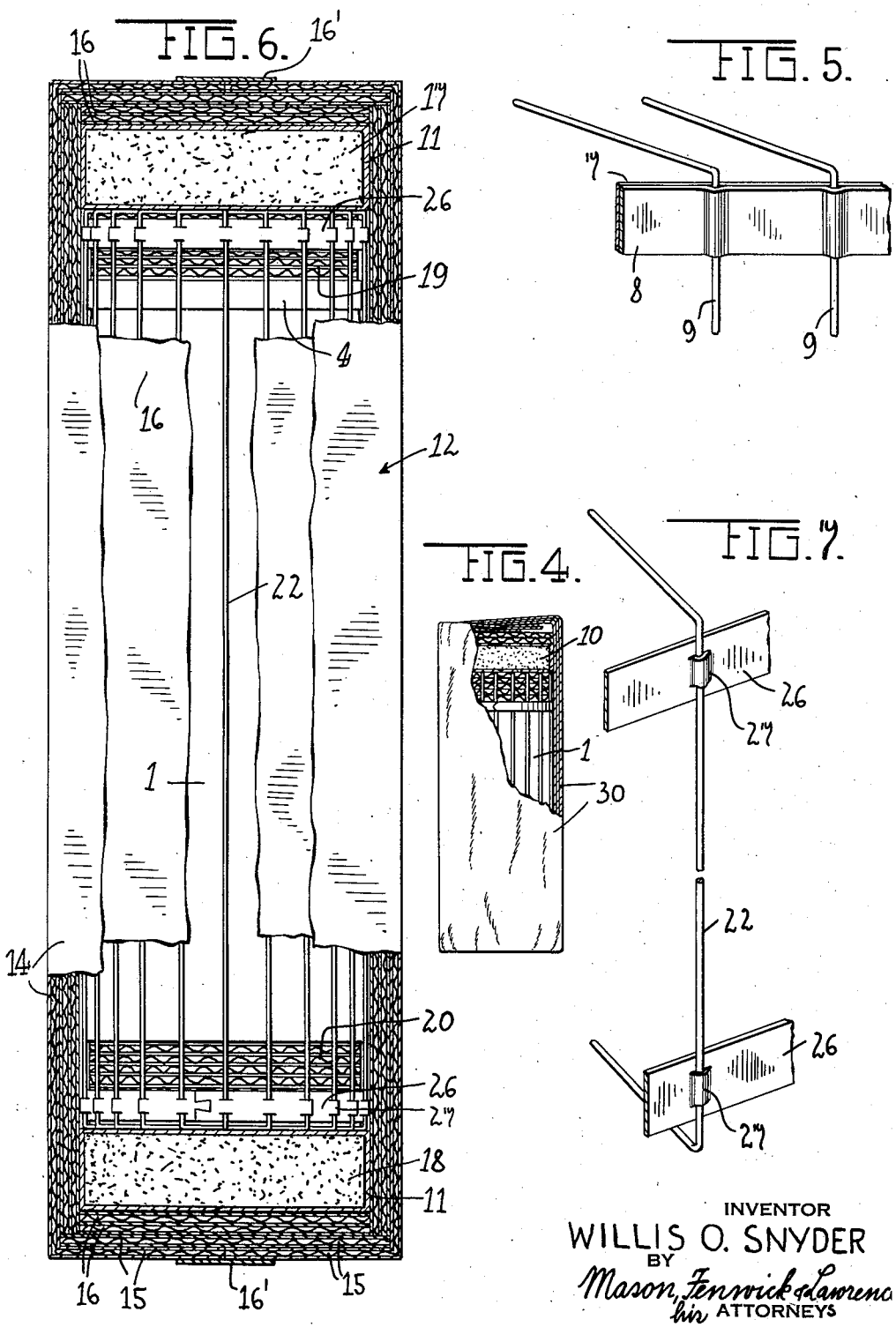
INVENTOR
WILLIS O. SNYDER
BY
Mason, Fenwick & Lawrence
his ATTORNEYS Dec. 17, 1935.  W. O. SNYDER  2,024,397
REFRIGERATING SHIPPING CARTON
Filed Nov. 11, 1932   3 Sheets-Sheet 3
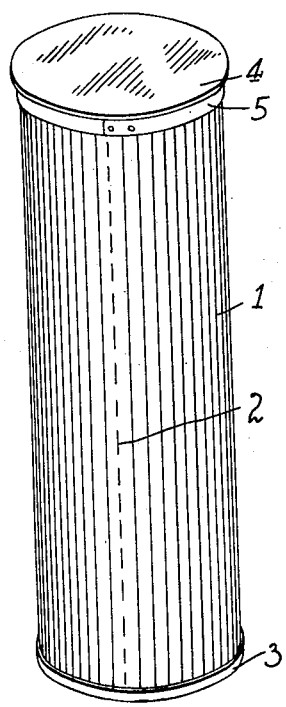
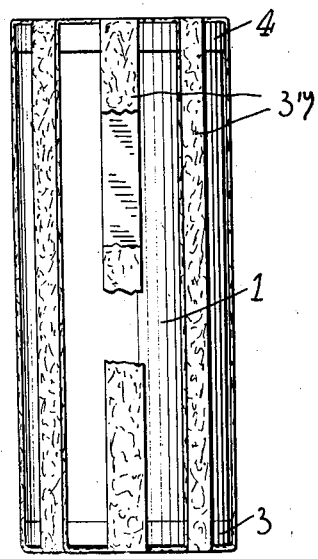
INVENTOR
WILLIS O. SNYDER
BY
Mason, Fenwick & Lawrence
ATTORNEYS Patented Dec. 17, 1935

2,024,397

UNITED STATES PATENT OFFICE 2,024,397

REFRIGERATING SHIPPING CARTON

Willis O. Snyder, Ridgewood, N. J., assignor to Gibraltar Corrugated Paper Co. Inc., North Bergen, N. J., a corporation of New Jersey Application November 11, 1932, Serial No. 642,304

6 Claims. (Cl. 62—91.5)

This invention relates to improvements in shipping cartons, and has more particular relation to shipping cartons provided with refrigerating means for preserving the proper uniform temperatures until they arrive at their destinations.

This invention is intended more particularly for use in the wide distribution of ice-cream and other prefrozen commodities, which demand a certain amount of uniform specified refrigeration in transit.

The prime object of the present invention is the provision of a refrigerating container so constructed that the refrigerating agent, such for instance as carbon dioxide, may be located at one or several points therein and the temperature of this carbon dioxide communicated uniformly about the entire food container by a metallic containing cage.

A further object of the invention is to provide a refrigerating receptacle for ice cream in which the temperature of the refrigerating agent is distributed uniformly about the entire receptacle with the refrigerating agent itself located at one or two major points.

The invention also has other objects, all of which will be hereinafter more particularly set forth and claimed.

In the drawings,

Figure 1 represents a perspective view of one of my improved containers, same being partly broken away at the top to show the end flaps.

Figure 2 represents a central vertical section through the same ready for shipment and containing the ice-cream and carbon dioxide.

Figure 3 represents a transverse horizontal section through my improved container on the line 3—3 of Figure 2.

Figure 4 represents a detail perspective view of a modified form of container.

Figure 5 represents a detail perspective view of one method of securing the spaced copper wires together.

Figure 6 represents a side elevation, partly broken away, of a modified form of my invention.

Figure 7 represents a detail perspective view of a modified form of metal strips for securing the cold communicating wires together.

Figure 8 represents a detail perspective view of the inner paper container for the product being shipped, and Figure 9 represents a detail view of a modified receptacle having metal coated paper strips.

Described in general terms, the present invention is intended for use where the centralization of manufacturing plants for perishable products has resulted in it becoming necessary to ship such perishable products to much greater distances than heretofore. In such systems of shipping, it has heretofore been the practice to ship such products as ice-cream or other commodities requiring refrigeration to preserve them to great distances in metal containers having ice or other suitable refrigeration in proximity to such containers to hold them at the proper preserving temperatures.

In this system it becomes necessary because of the substantial cost of the metal containers to ship these containers back to the original point of packing as they are too costly to be discarded.

With the present invention, however, the whole shipping package is practically constructed of paper with very little metal employed so that after the package reaches its destination and its contents are removed, it may be thrown away or discarded, the cost being less than the cost of shipping the metal containers back to their original shipping point.

In designing the present package, the inventor has taken advantage of the well-known insulating qualities of paper or paper board in resisting the passage of heat or cold and has also employed the commodity known as carbon dioxide which is at the present time a common article of sale on the market.

The inner container for the ice-cream as shown in Figure 8, comprises a flat strip of scored straw-board 1, bent into a cylinder and secured together by metal staples or stitching 2. The bottom of this receptacle which is also of straw-board is secured by a crimped metal ring 3. The removable top 4 is also provided with a metal ring 5 which slips down over the side wall 1, the two ends of this ring being secured together in any suitable manner, but preferably by "spot" welding.

This inner container 1, after being packed with ice-cream, is first surrounded by a cage of wires 9. This cage is made up of vertical strands of copper, aluminum or other heat conducting material, held together in spaced relation by top and bottom strips of paper 7 and 8, as best shown in Figure 5, the strips being suitably glued together with the wires imbedded therein at distances of about 1¼" apart; a 16 cage wire preferably being used.

Each wire 9 passes down under the bottom of the can and up the diametrically opposed side, the wires being of such length that they project above the upper end of the container. It will be understood that this arrangement of the wires 9 forms in effect a containing cage completely surrounding the food container and absorbing heat at a number of points equally spaced so as to preserve a uniform temperature about the entire food container without lowering the temperature at any one point sufficiently to freeze the contents of the container.

The cake of carbon dioxide 10 is wrapped in a piece of stiff paper 11, so as to preserve it in its cake form even after it has its bulk greatly decreased by evaporation. After the container with its wire cage has been inserted into the outer receptacle 12, spacers 13 constructed of corrugated cardboard are placed upon the top of the filled receptacle and the ends of the wires 9 bent down upon the top of these spacers in radial formation as shown in Figure 3. The object of this spacer is to prevent the extreme cold in proximity to the cake of carbon dioxide 10 from reaching the top portion of the ice-cream packed in the receptacle, as it has been found that should this carbon dioxide be placed directly on top of the receptacle, a large portion of the ice-cream in the upper part of the receptacle will be frozen solid and can only be removed with an ice-pick which would, of course, destroy it as a food.

In this event, it has been found that a cake of carbon dioxide applied top and bottom will cause the opposite ends of the ice-cream to solidify and leave the intermediate portion too soft for use.

The present invention, however, effectively overcomes this failing as the heat from the ice-cream container and surrounding space is absorbed by the wires 9 and passing down the sides of the receptacle, creates an enveloping blanket of cold air about the receptacle and between the receptacle and the outer container. This outer container comprises an outer layer 14 of what is known as double face corrugated board formed from a single piece and suitably scored to form four end flaps 15 at each end. These as best shown in Figure 1, are doubled over the top and bottom of the receptacle and finally secured in position by adhesive fabric or paper tape 16' in a manner well known in the art. Inside the outer wall 14 is provided two double face corrugated walls 16 on all four sides and also top and bottom, as best shown in Figure 2.

By reference to Figure 3, it will be seen that the cylindrical receptacle 1 when placed in the rectangular outer container, leaves air spaces or chambers about practically the entire receptacle so that by holding the temperature of these air spaces to a low degree by the presence of the wires 9, all heat from the exterior of the package is prevented from striking inwardly and reaching the contents of the inner receptacle.

The conductivity of the wires 9 is such that the extreme low temperature of the carbon dioxide continues to absorb the heat along these wires and keeps the entire package uniformly cold without the top or the bottom becoming solid and without the intermediate portions of the contents being soft. The entire construction being of paper and a small quantity of wire, of course, means very little expenditure to produce it, and for this reason, can be thrown away when it reaches its destination without its loss becoming a factor in the shipping problem.

In the modification of my invention shown in Figure 6, I provide cakes of carbon dioxide 17 and 18 located at the top and bottom respectively of the receptacle. In this form of the invention, spacers 19 and 20 are provided and the wires 22 instead of being of U formation as shown in Figure 2 are separated and each wire bent at the top and bottom over its respective spacer so as to contact with its respective cake of carbon dioxide.

In the form shown in Figure 2, a cake of carbon dioxide of approximately 5" in height and 9" in diameter is used, whereas in the form shown in Figure 6, 2 cakes each of 2½" in height and 9" in diameter are employed. In some instances the form shown in Figure 6 is desirable as the absorbing of the heat by the carbon dioxide is a little more uniform than when the cake is located at one end only. The form shown in Figure 6 is desirable when the receptacle is shipped into southern countries where the temperature is higher.

In the modified form of the construction of the cages shown in Figure 7, the wires 25 are held together by aluminum or copper bands 26. These bands are stamped with loops 27 through which the wires are forced with sufficient friction to hold the bands 26 in position. These bands, in turn, hold the wires properly spaced, and being of metal, assist in communicating the temperature of the wires uniformly throughout the space surrounding the inner receptacle.

While I have described the inner receptacle 30 and the outer container as being constructed of paper or paperboard, it will be understood that these parts may be constructed of fibre, or any other cheap heat insulating material that could economically be discarded after the package had reached its destination.

It will also be observed that should a cake of carbon dioxide be arranged at each end of the container without applicant's devices, then the ice-cream contained within the receptacle will be frozen hard for a considerable distance at the top and bottom, while the intermediate portion of the ice-cream in the receptacle will finally become softened by the cold extracted through the walls of the receptacle and the container.

With applicant's structure, however, the air space formed between the cylindrical inner receptacle and the square outer container is kept at an even temperature by the wires so that any heat to which the container is subjected will never reach the inner receptacle and this inner receptacle will be kept uniformly cold from top to bottom.

In order to cheapen the shipping structure, it may become desirable for the outer container to be omitted. In this event the inner receptacle with the cake of carbon dioxide supported by the spacers and the heat transmitting cage, are wrapped in heavy shipping paper 30, such as shown in Figure 4.

In the modified form shown in Figure 9, the heat communicating strips 37 are utilized in substantially the same way as the wires previously described. These wires are made up of thin paper strips, thickly coated with copper, aluminum or other shavings so that they will communicate the heat from the carbon dioxide to the inner receptacle and cool the air space between the inner receptacle and outer container.

The expressions "carbon dioxide" and "dry ice" have been used in this specification and claims as corresponding terms.

What I claim is:

1. In a refrigerating container, the combination with a paper-board receptacle, a cake of carbon dioxide, a paper-board container surrounding the receptacle, and of larger size and having a chamber at one end for receiving the cake of carbon dioxide and a series of spaced wires lying in proximity to the receptacle and having their ends arranged to support the cake of carbon dioxide.

2. In a refrigerating container, the combination with a paper-board receptacle, of an outer container for the same having two chambers for receiving carbon dioxide and wires in proximity to the walls of the receptacle and having their opposite ends arranged to contact with the respective cakes of carbon dioxide.

3. In a refrigerating container, the combination with a receptacle for containing the goods to be shipped, of an outer container surrounding the same, a cake of carbon dioxide and cold conducting strips between the carbon dioxide and the walls of the container comprising flexible non-conducting strips coated with conducting metal shavings.

4. In a refrigerating container, the combination with a paper board receptacle, of a cake of carbon dioxide, a paper board container surrounding the receptacle and having a chamber at one end for receiving the cake of carbon dioxide, and a series of spaced wires lying in proximity to the receptacle to completely surround the same in equally spaced arrangement, and contacting with the cake of carbon dioxide.

5. In a refrigerating container, the combination with a paper board receptacle, of a cake of carbon dioxide, a paper board container surrounding the receptacle and having a chamber for receiving the cake of carbon dioxide and a metallic cage completely surrounding the receptacle and comprising a series of equally spaced metallic wires for absorbing heat at a number of equally spaced distances from the food in the receptacle to provide a practically uniform temperature about the entire food receptacle, said wires communicating their heat to the cake of carbon dioxide.

6. In a refrigerating container, the combination with a paper board receptacle, a cake of dry-ice, a paper board container surrounding the receptacle and of larger size and having a chamber for receiving a cake of dry ice, and a series of spaced metallic conductors lying in proximity to the receptacle and having their ends arranged in proximity to the cake of dry-ice.

WILLIS O. SNYDER.